United States Patent [19]
Hofer

[11] 3,875,326
[45] Apr. 1, 1975

[54] EXPLOSIVELY OPERATED WELDING CARTRIDGE

[75] Inventor: Peter Hofer, Hofen, Switzerland

[73] Assignee: Georg Fischer Aktiengesellschaft, Schaffhausen, Switzerland

[22] Filed: Feb. 12, 1973

[21] Appl. No.: 331,883

[30] Foreign Application Priority Data
Feb. 29, 1972 Switzerland............... 002920/72

[52] U.S. Cl............... 174/94 R, 29/470.2, 29/628, 102/24 R, 174/84 C, 339/276 E
[51] Int. Cl. ............................................ H02q 15/08
[58] Field of Search ............. 174/94 R, 84 C, 90; 339/276 E; 102/24 R, 23 R, 28; 29/421 E, 470.2, 628

[56] References Cited
UNITED STATES PATENTS

| | | |
|---|---|---|
| 3,019,284 | 1/1962 | Matthysse.................... 174/90 X |
| 3,184,535 | 5/1965 | Worthington..................... 174/90 |
| 3,364,304 | 1/1968 | Modrey...................... 174/94 R |
| 3,780,927 | 12/1973 | Kudinov et al............... 29/421 E X |

*Primary Examiner*—Darrell L. Clay
*Attorney, Agent, or Firm*—Finnegan, Henderson, Farabow & Garrett

[57] ABSTRACT

An explosion welding cartridge for joining metallic components and more particularly electrical conductors including an outer explosive case having a ring of an explosive material located within the case and a connecting sleeve located within the ring, the sleeve having at least two apertures for receiving the components to be joined and a detonation cord or strip action-connected to the outer case.

18 Claims, 8 Drawing Figures

EXPLOSIVELY OPERATED WELDING CARTRIDGE

The present invention concerns an explosion welding cartridge for the joining of metallic components, in particular electric conductors.

The joining of wires of overhead transmission lines and the like is normally effected by means of hydraulic presses or so-called cone shackles. Another known joining method is the so-called Alutherm method. These methods are either expensive and do not give optimal electrical connection or then they are difficult to carry out without special tools. The object of the present invention is to avoid such drawbacks.

Prior art further includes explosion welding of metal plates and the joining of components by explosion compression.

The explosion welding cartridge claimed hereunder is characterized by a case which is at least in parts rotation-symmetrical and which contains explosive arranged in the form of a ring closed upon itself and which presents at least one central aperture holding at least one joining part which presents at least one recess to receive at least one other part, and is further characterized by at least one detonating cord or detonating strip which is action-connected to the said case.

The present invention is now to be described by way of example with reference to the accompanying drawings, in which FIG. 1 shows an axial section through an explosion welding cartridge for the bonding of two wires;

Figure 1:
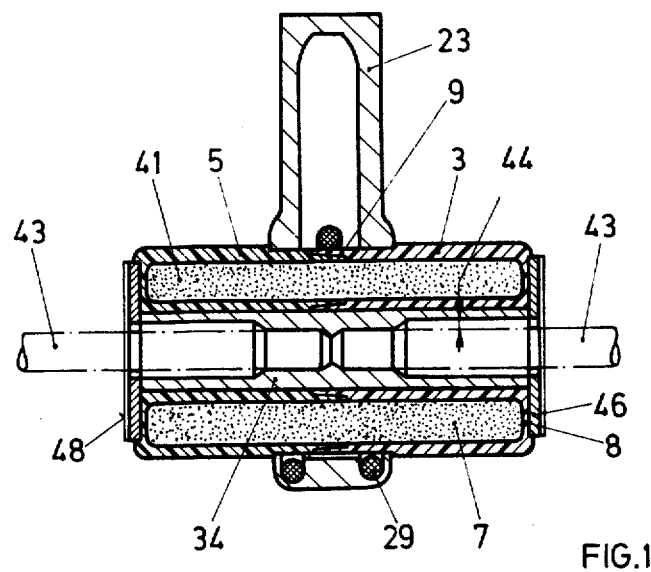
Figure 5:
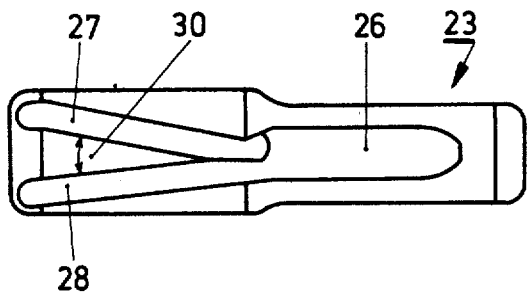
FIG. 5 shows a view of part of an ignition case.
Figure 8:
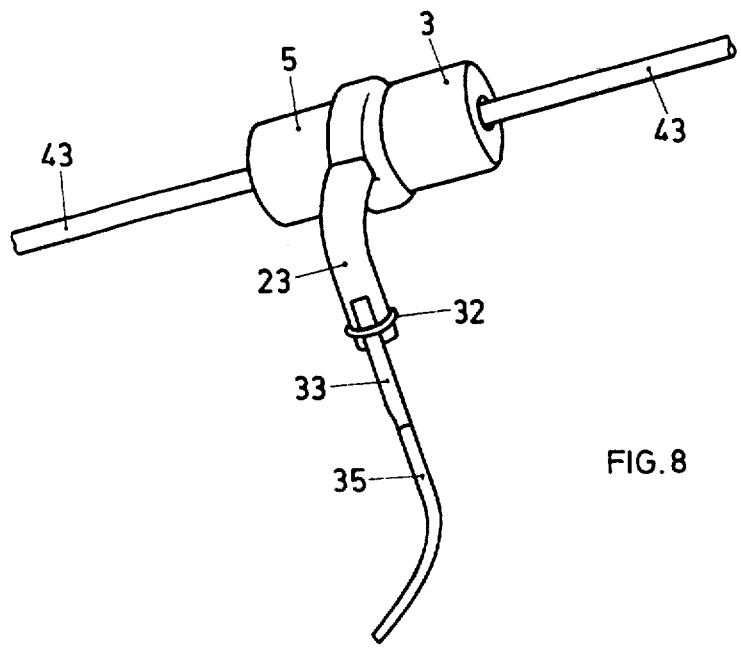
FIG. 8 shows a perspective view of a cartridge, with the wire ends introduced, immediately before blasting.
Figure 6:
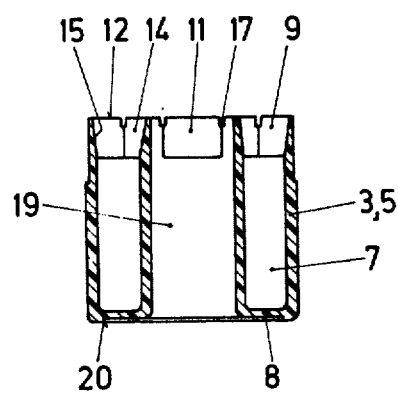
FIG. 6 shows an axial section through one half of the explosive case.
Figure 7:
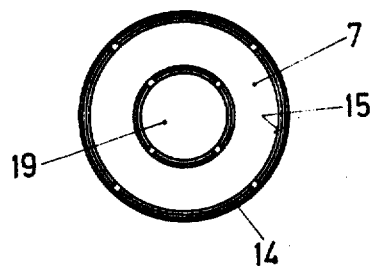
FIG. 7 shows a top view of part of the explosive case according to FIG. 6.

FIG. 1 shows the construction of an explosion welding cartridge 1. The cartridge 1 comprises two exactly identical explosive case halves 3 and 5, shown in FIGS. 6 and 7. The case halves 3 and 5 present an annular space 7 serving to receive explosive and are each provided outwards with an endpiece 8 and, opposite thereto, an edge and connecting element 9. The element 9 is divided into four sectors 11. The termination of the element 9 is formed by four ring surface sectors 12. The element 9 presents outer cone surfaces 14 alternating with inner cone surfaces 15, separated by slots 17. The case halves 3 and 5 also present a centrically arranged core channel 19. The endpiece 8 presents a shoulder 20. The case halves 3 and 5, designed to be fitted together and cemented, are provided at their free ends, in the zone of the element 9, with shoulders designed for the axial positioning of ignition case parts 23 and 24. Their construction may be seen from FIGS. 2 and 5 in particular. The ignition case parts 23 and 24 are provided with a main groove 26 and with subsidiary grooves 27 and 28 serving to receive a single-piece detonating cord 29 or a detonating strip. As shown in FIG. 5, the two subsidiary grooves 27 and 28 diverge with respect to the central plane. They form a divergence angle 30, which is between 0 and about 80 degrees, according to sleeve diameter and type of explosive. This divergence angle 30 ensures a uniform connection between the parts to be welded, as the propagation front of the detonation proceeds in a manner uniform and perpendicular to the sleeve axis. In two-piece connections, the cord 29 is only laid round once. Instead, it may also be arranged inside the explosive 41.

Figure 2:
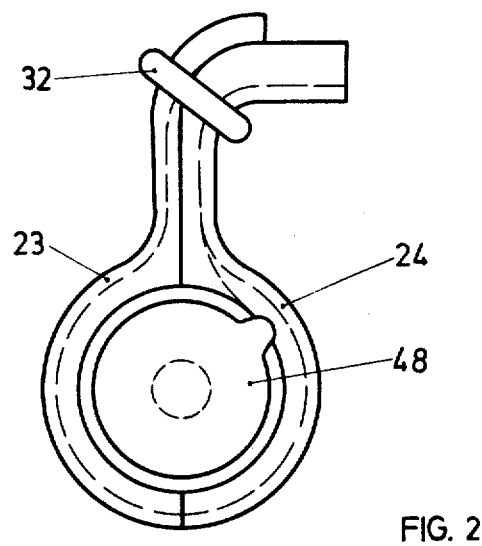
FIG. 2 shows an end view of the cartridge according to FIG. 1.

As shown in FIG. 2, the free end of the two ignition case parts 23 and 24 presents an O-ring 32 serving to press the ignition cap 33 with the fuse cord 35 against the ends of the detonating cord 29. This, however, is only done at erection on the site.

The ends of the ignition case parts 23 and 24 are bent in a direction perpendicular to the sleeve axis in order to prevent any splinters of the cap 33 from damaging the conductors. The bend in the example shown is such that the explosive case axis and the ignition cap axis are askew with respect to each other.

Figure 3:
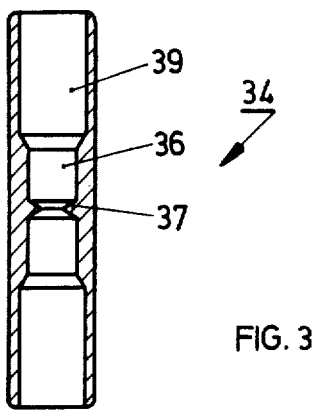
FIG. 3 shows an axial section through a joining sleeve of the cartridge according to FIGS. 1 and 2.

FIG. 3 shows the connecting sleeve 34 associated with the explosion welding cartridge 1. The sleeve is provided towards the middle with two guide bores 36 separated from each other by a stop 37. Adjoining each guide bore 36 outwards is a welding bore 39.

The annular space 7 (FIG. 1) contains explosive 41. FIG. 1 further shows the welding end of a wire 43 whose outer surface is separated from the inner surface of the welding bore 39 by an annular space 44.

Figure 4:
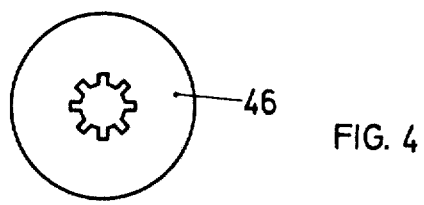
FIG. 4 shows retaining disks which are to be arranged on the end surfaces of the cartridge and which serve to hold the wires before blasting.

The explosion welding cartridge is assembled as follows:

A quantity of explosive is gouged out of a cake by means of the case halves 3 and 5 pressed into the cake. Then the explosive present in the core channel 19 is pressed out. Next, the outer and inner cone surfaces 14 and 15 respectively are coated with an adhesive, and the two case halves 3 and 5, which are identical in construction, are turned so that the cone surfaces 14 and 15 come to lie conversely on the other surfaces 15 and 14. Then the detonation cord 29 is wound twice round the case 3/5 in the zone of the middle thereof, after which the two ignition case parts 23 and 24 are slipped on to the case 3/5. The detonating cord 29 is suitably laid into the grooves 26, 27 and 28, and the whole unit is glued together. Next, the connecting sleeve 34, such as a copper sleeve, is inserted into the core channel 19 and glued in position. Then a retaining disk 46 is glued into the shoulder 20 of the endpiece 8 at each end of the cartridge 1. The disk 46 presents inward-pointing teeth (FIG. 4). These teeth define an inner diameter which is slightly smaller than that of the conductor wire 43 to be welded, in such a manner that the wire, when inserted into the teeth, is secured against falling out before blasting. The disks 46 serving to hold the conductors 43 before blasting are made of an elastic plastic, such as Nylon, Delrin or the like. Instead, they may be punched from metal. Also, they may be formed integral with the case. Then the aperture of each disk 46 is covered by a tab 48 which seals off the interior of the cartridge 1 and thus prevents corrosion of the internal parts, notably of the connecting sleeve bores. Finally, the O-ring 32 is slipped over the ignition case 23/24. The explosion welding cartridge is now ready for use.

The explosion welding cartridge is applied as follows:

First, the wire ends to be welded are brushed bright. Then the tabs 48 at the two ends of the case 3/5 are removed, and the cleaned wire ends are inserted into the sleeve 34 in such a manner that they are centered in the guide bores 36 and are held at the stops 37 in axially correct position. The two wire ends are thus held both in the sleeve 34 and in the retaining disks 46. After insertion of the detonating cap 33 and securing thereof by the O-ring 32, the end of the fuse cord 35 is lit with a match or a flame.

Detonation of the explosive 41 results in a bond between the wire ends and the sleeve 34, except that the outer edge portions of the sleeve 34 are not welded to the wire 43, an advantage particularly in terms of strength, as no notch affects arise. It has thus been found advantageous to arrange the explosive along the sleeve outwards in such a manner that the end of the sleeve does not undergo welding along at least 1% of the sleeve length. The other parts of the cartridge are either blasted off or evaporated by the explosion.

The explosion welding cartridge can be used to bond wires of the most varied materials, in particular metals, and multi-wire conductors, strands, etc. It is also possible to weld cable shoes to conductors and to produce simple or multiple branches of wires or the like.

It is also possible to join one end of a conductor by explosion welding (as described) and to join the other end not by explosion welding, but by simple compression, though with the same explosive charge.

Moreover, two conductors of different materials can be joined by the same sleeve. This permits aluminium-copper connections to be easily made.

Again, the explosion welding cartridge may be embedded in a sound-proofing mass, such as foam plastic alone or combined with a sand bed. The case parts of the cartridge are preferably made of plastic, such as polystyrene or the like.

Instead of using simple cylindrical or conical explosive cases for the bonding of two or three conductors, it is possible to use T-shaped, double-T-shaped or otherwise shaped cases of suitable design for the bonding of several conductors.

What is claimed is:

1. An explosion welding cartridge for joining metallic components, which comprises:
   a hollow receptacle substantially symmetrical about its axis, said hollow receptacle consisting of a pair of parts which fit together, each of said parts including an inner annular wall and an outer annular wall which define an annular space therebetween, said inner annular wall defining a central aperture;
   an explosive charge arranged within said annular space in said receptacle in the form of a closed ring;
   a connecting element extending through said central aperture and including recesses at opposite ends thereof for receiving the metallic components to be connected, each recess comprising a first axial opening extending inwardly from the respective end of said connecting element and a second axial opening of smaller cross section than said first axial opening extending inwardly from said first axial opening and terminating in a reduced section to limit inward movement of the metallic components into said connecting element; and
   means for detonating said explosive charge to join said connecting element to the metallic components.

2. The explosion welding cartridge of claim 1, wherein said receptacle consists of a pair of substantially identical parts.

3. The explosion welding cartridge of claim 2, wherein said parts are glued together.

4. The explosion welding cartridge of claim 2, wherein said explosive charge is arranged symmetrically about the axis of said receptacle.

5. The explosion welding cartridge of claim 2, said detonation cord is arranged within said ignition case in one or more coils which surround said connecting element.

6. The explosion welding cartridge of claim 1, wherein said receptacle is composed of evaporable material.

7. The explosion welding cartridge of claim 1 wherein said detonating means comprises:
   an ignition case attached to said receptacle for receiving a detonation cord.

8. The explosion welding cartridge of claim 1, wherein said detonating means comprises a detonation cord provided with an explosive having a disruptive power exceeding the disruptive power of said explosive charge.

9. The explosive welding cartridge of claim 8, wherein said detonation cord is provided with an explosive having a disruptive power approximately four times greater than the disruptive power of said explosive charge.

10. The explosion welding cartridge of claim 1, which includes retaining means located at opposite ends of said receptacle for holding the metallic components to be inserted into said connecting element.

11. The explosion welding cartridge of claim 10, wherein said retaining means comprises retaining discs located at opposite ends of said receptacle, each retaining disc being provided with a central aperture for receiving the corresponding metallic component inserted into said connecting element and including teeth extending inwardly into its central aperture to engage and hold the metallic component in said connecting element.

12. The explosion welding cartridge of claim 1, which includes:
   removable tabs located at opposite ends of said receptacle for covering said recesses in said connecting element to protect said connecting element against corrosion.

13. The explosion welding cartridge of claim 1, wherein said explosive charge is arranged in the form of a hollow cone.

14. An explosively operated welding cartridge for joining metallic components, which comprises:
   a hollow receptacle substantially symmetrical about its axis;
   an explosive charge arranged within said receptacle in the form of a closed ring to provide a central aperture;
   a connecting element extending through said central aperture and including recesses at opposite ends thereof for receiving the metallic components to be connected, each recess comprising a first axial opening extending inwardly from the respective end of said connecting element and a second axial opening of smaller cross-section than said first axial opening extending inwardly from said first axial opening and terminating in a reduced section to limit inward movement of the metallic component into said connecting element; and means for detonating said explosive charge to join said connecting element to the metallic component, said detonating means comprising an ignition case attached to said receptacle and provided with at least one groove for receiving a detonation cord, said groove being oriented at an angle equal to or less than 90° with respect to the axis of said receptacle.

15. The explosively operated welding cartridge of claim 14, wherein said ignition case comprises:

a pair of mating case parts surrounding said receptacle, each part including an annular portion provided with a recess which mates with the recess of the annular portion of the other part to define said groove and an elongated portion extending laterally from the annular portion which mates with the elongated portion of the other part; and a fastening element surrounding said elongated portions of said case parts to hold said case parts together.

16. The explosively operated welding cartridge of claim 15, wherein said elongated portions of said ignition case parts are bent at the extended ends thereof to position the ignition cap askew with respect to the axis of said receptacle.

17. The explosively operated welding cartridge of claim 14, wherein said ignition case is provided with a pair of grooves which diverge with respect to a central plane through the receptacle for receiving the detonation cord.

18. The explosively operated welding cartridge of claim 17, wherein said pair of grooves diverge at an angle between 0° and 80°.

* * * * *